United States Patent
Fujiwara et al.

(10) Patent No.: US 8,150,204 B2
(45) Date of Patent: Apr. 3, 2012

(54) NOISE REDUCER FOR VIDEO SIGNALS

(75) Inventors: Takashi Fujiwara, Tokyo (JP);
Toshihiro Gai, Tokyo (JP); Koji Minami, Tokyo (JP); Hironobu Yasui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1062 days.

(21) Appl. No.: 12/073,664

(22) Filed: Mar. 7, 2008

(65) Prior Publication Data
US 2008/0231753 A1 Sep. 25, 2008

(30) Foreign Application Priority Data

Mar. 23, 2007 (JP) ................................. 2007-075877
Nov. 16, 2007 (JP) ................................. 2007-297668

(51) Int. Cl.
*G06K 9/40* (2006.01)
(52) U.S. Cl. ........................................ 382/275; 348/607
(58) Field of Classification Search .................. 382/275
See application file for complete search history.

(56) References Cited

U.S. PATENT DOCUMENTS

| | | | | |
|---|---|---|---|---|
| 5,442,462 A * | 8/1995 | Guissin | ............... | 358/463 |
| 5,497,338 A * | 3/1996 | Miyake et al. | ............... | 382/232 |
| 5,682,438 A * | 10/1997 | Kojima et al. | ............... | 382/107 |
| 5,892,592 A * | 4/1999 | Adachi et al. | ............... | 358/462 |
| 6,636,630 B1 * | 10/2003 | Adachi et al. | ............... | 382/176 |
| 6,714,242 B1 * | 3/2004 | Kobayashi | ............... | 348/272 |
| 7,031,498 B2 * | 4/2006 | Aldrich et al. | ............... | 382/107 |
| 7,110,612 B1 * | 9/2006 | Wang | ............... | 382/262 |
| 7,176,983 B2 * | 2/2007 | Chiang et al. | ............... | 348/630 |
| 7,218,354 B2 * | 5/2007 | Tanaka | ............... | 348/448 |
| 7,227,897 B2 * | 6/2007 | Nishibori et al. | ............... | 375/240.16 |
| 7,336,710 B2 * | 2/2008 | Kim et al. | ............... | 375/240.16 |
| 2003/0156301 A1 * | 8/2003 | Kempf et al. | ............... | 358/486 |
| 2003/0189671 A1 * | 10/2003 | Amano | ............... | 348/607 |
| 2004/0012720 A1 * | 1/2004 | Alvarez | ............... | 348/607 |
| 2005/0110907 A1 * | 5/2005 | Jung | ............... | 348/701 |
| 2006/0245499 A1 * | 11/2006 | Chiu et al. | ............... | 375/240.18 |
| 2007/0196018 A1 * | 8/2007 | Chen et al. | ............... | 382/209 |
| 2008/0181523 A1 * | 7/2008 | Yoo et al. | ............... | 382/254 |
| 2008/0218630 A1 * | 9/2008 | Kempf et al. | ............... | 348/452 |

(Continued)

FOREIGN PATENT DOCUMENTS

JP 5-103226 A 4/1993

(Continued)

OTHER PUBLICATIONS

Yoshinori, I. et al., English Translation of "Reducing Method for Noise of Television Video Signal", JP 08214192, p. 1-3.*

*Primary Examiner* — Jason M Repko
*Assistant Examiner* — Gandhi Thirugnanam
(74) *Attorney, Agent, or Firm* — Birch, Stewart, Kolasch & Birch, LLP.

(57) ABSTRACT

A noise reducer for a signal determines a direction of correlation for each picture element (pixel) by calculating sums of absolute differences between a block centered on the pixel and neighboring blocks centered on surrounding pixels and choosing the direction of the neighboring block with the least sum of absolute differences. The pixel is then filtered one-dimensionally by averaging it with neighboring pixels located in the direction of correlation. This noise reduction method is simple, reliable, and avoids needless loss of detail.

13 Claims, 16 Drawing Sheets

U.S. PATENT DOCUMENTS

| | | |
|---|---|---|
| 2008/0231753 A1* | 9/2008 | Fujiwara et al. .............. 348/607 |
| 2009/0041371 A1* | 2/2009 | Hasegawa ..................... 382/261 |
| 2010/0086202 A1* | 4/2010 | Omata et al. .................. 382/162 |

FOREIGN PATENT DOCUMENTS

| | | |
|---|---|---|
| JP | 8-214192 A | 8/1996 |
| JP | 10-178560 A | 6/1998 |
| JP | 2005-63097 A | 3/2005 |
| JP | 2006-115078 A | 4/2006 |
| JP | 2006-115268 A | 4/2006 |
| JP | 2006-165609 A | 6/2006 |
| JP | 2007-141176 A | 6/2007 |

\* cited by examiner

NOISE REDUCER FOR VIDEO SIGNALS

BACKGROUND OF THE INVENTION

1. Field of the Invention

The present invention relates to a two-dimensional noise reducer for video signals.

2. Description of the Related Art

Methods of reducing noise in video pictures are classified as two-dimensional if they use only the two spatial dimensions, and as three-dimensional if they also use the time dimension.

Three-dimensional noise reduction works well for stationary parts of a video picture. It is relatively easy to store one or more preceding frames in a frame buffer and detect noise in stationary parts of the current frame by comparing these parts with the preceding frames. For moving parts of the picture, however, it is necessary to add motion compensation by detecting motion vectors. This leads to complex algorithms, requiring extra hardware, and works well only under limited conditions. Particularly for pictures with high-speed motion, detecting the motion and finding the correct motion vectors remains a computationally challenging task.

A simpler method of noise reduction is noise coring: the removal of high-frequency signal components of low amplitude. This method can be practiced in two dimensions, making it applicable to moving pictures without the need for motion compensation, regardless of the motion speed. Noise coring has the drawback, however, of degrading the picture by removing low-amplitude fine detail as well as noise.

Another two-dimensional method, disclosed in Japanese Patent Application Publication No. 8-214192, processes each picture element (pixel) individually by averaging the pixel value with the values of other pixels located in directions in which there is no pixel with a greatly different value. That is, a pixel is averaged with other pixels located in all directions that show a certain degree of correlation with the pixel. This method turns out to be unreliable because of false correlation detection, leading to the inclusion of irrelevant pixels in the average value.

Despite the difficulties associated with motion compensation, a satisfactory alternative has yet to be found. There is an unmet need for a reliable two-dimensional noise reduction method that can avoid the loss of detail caused by noise coring.

SUMMARY OF THE INVENTION

An object of the present invention is to reduce noise reliably in both stationary and moving parts of a picture without requiring motion compensation or a frame buffer, and without causing needless loss of detail.

The present invention provides a noise reducer including a sum of absolute differences calculation circuit, a correlation direction decision circuit, and a variable-direction one-dimensional filter circuit.

The sum of absolute differences calculation circuit selects each pixel in an input video signal in turn as a pixel of interest and calculates sums of absolute differences between a central block of a predetermined size centered on the pixel of interest and neighboring blocks of the same size. A sum of absolute differences is calculated as a sum of absolute differences between values of pixels in corresponding positions in the central block and the neighboring block. One sum of absolute differences is calculated for each of the eight neighboring blocks centered on the pixels adjacent the pixel of interest above and below it, and to its left, right, upper right, lower right, upper left, and lower left.

The correlation direction decision circuit selects a direction of correlation indicated by a line extending from the pixel of interest through the center of the neighboring block having the minimum sum of absolute differences.

The variable-direction one-dimensional filter circuit calculates a weighted average of the pixel of interest and at least one pixel located in the correlation direction from the pixel of interest, and generates an output signal having the weighted average as the value of the pixel of interest.

Since only pixels in the same frame are processed, there is no need for motion detection or a frame buffer.

Noise reduction is reliable because the direction of correlation is determined from comparisons between blocks of pixels, rather than just by testing pixels in candidate directions.

Needless loss of detail is avoided because a pixel is averaged only with correlated pixels.

DETAILED DESCRIPTION OF THE INVENTION

Figure 1:
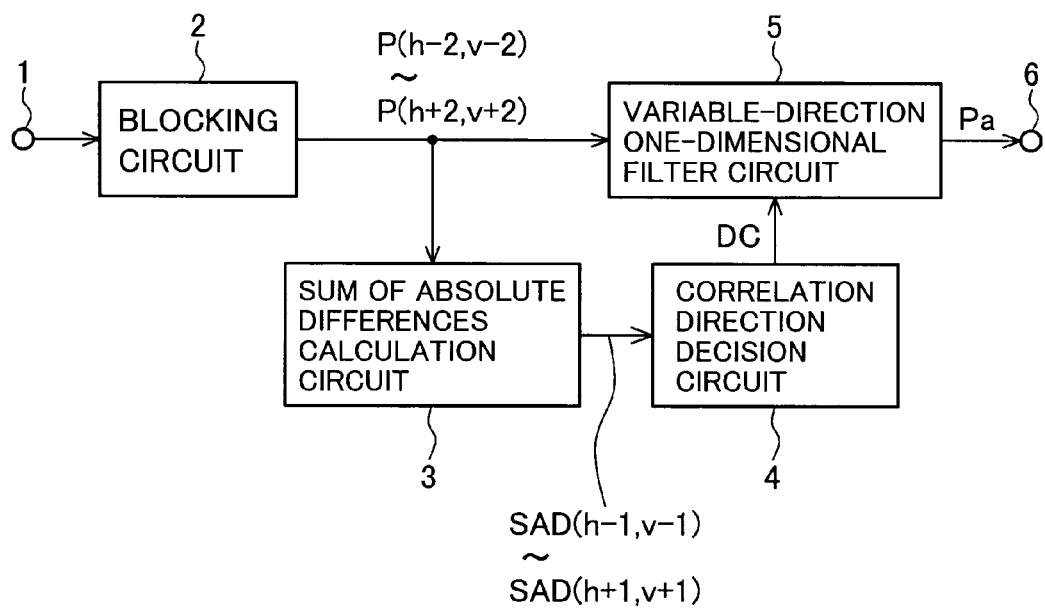
FIG. 1 is a block diagram showing a noise reducer according to a first embodiment of the invention.

Embodiments of the invention will now be described with reference to the attached drawings, in which like elements are indicated by like reference characters.

First Embodiment

Referring to FIG. 1, the noise reduction apparatus includes an input terminal 1, a blocking circuit 2, a sum of absolute differences calculation circuit 3, a correlation direction decision circuit 4, a variable-direction one-dimensional filter circuit 5, and an output terminal 6.

A video signal such as a television signal is received at the input terminal 1 and supplied to the blocking circuit 2, which rearranges the signal data into a form suitable for two-dimensional processing.

The video signal input to the input terminal 1 represents a matrix of pixel values on a screen scanned one horizontal line at a time, the lines being scanned in order from top to bottom and the pixels in each line being scanned from left to right. One complete scan of the screen constitutes a frame. In each frame, the blocking circuit 2 selects the pixels one by one, the selected pixel becoming the current pixel of interest, and outputs the values of the pixels in a five-by-five block or matrix centered on the pixel of interest. This operation is synchronized with a pixel clock signal (not shown). In each pixel clock cycle, the blocking circuit 2 receives one pixel value from the input terminal 1 and outputs one five-by-five matrix of pixel values.

The position of a pixel on a screen is represented by horizontal and vertical integer coordinate values. The horizontal coordinate value increases by one per pixel from left to right; the vertical coordinate value increases by one per pixel from top to bottom.

Figure 2:
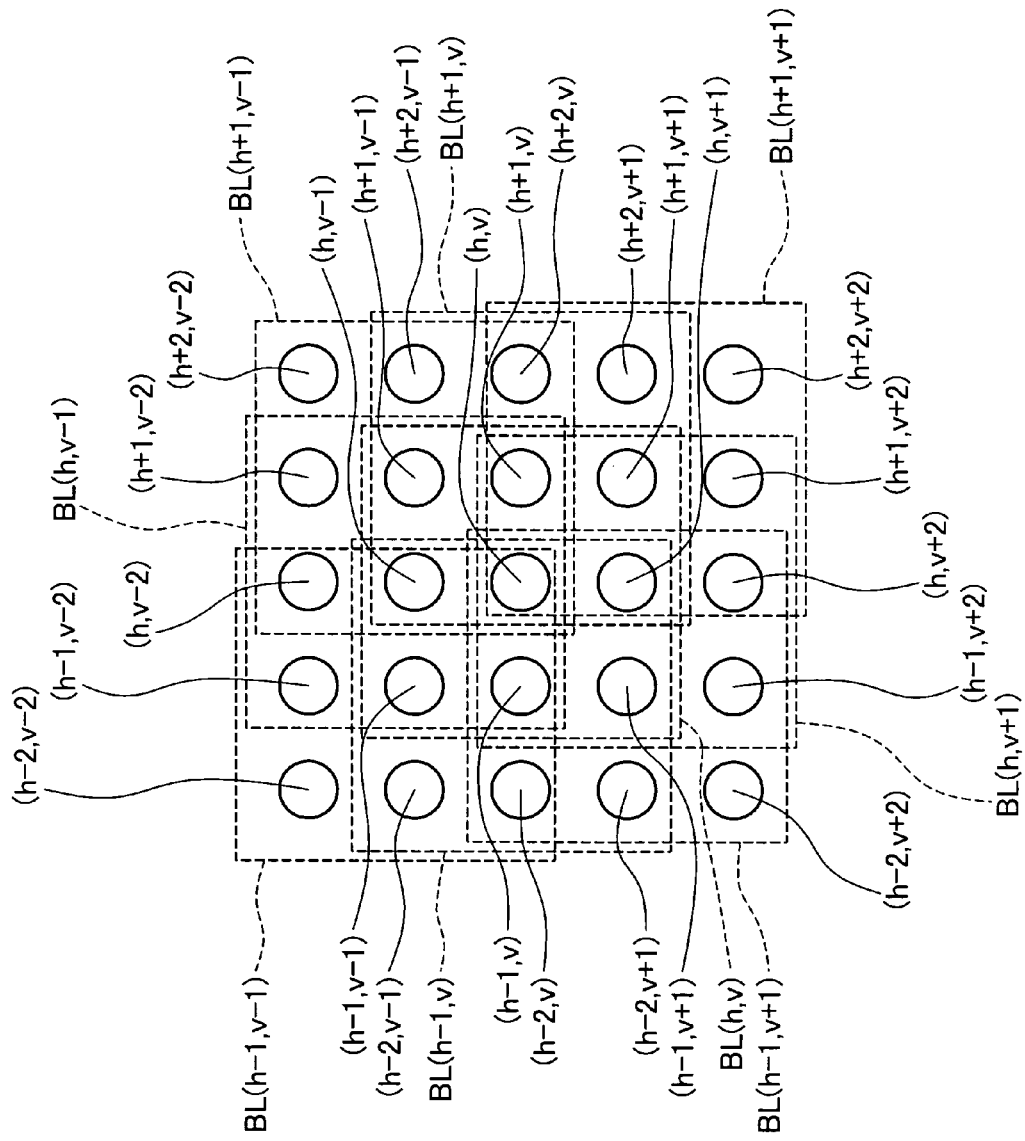
FIG. 2 is a diagram illustrating a central block and neighboring blocks.

Referring to FIG. 2, if the pixel of interest has coordinates (h, v), the five-by-five matrix of pixel values output by the blocking circuit 2 corresponds to the pixels with the following coordinates: in the first line, (h−2, v −2), (h−1, v−2), (h, v−2), (h+1, v−2), (h+2, v −2); in the second line, (h−2, v−1), (h−1, v−1), (h, v−1), (h+1, v−1), (h+2, v−1); in the third line, (h−2, v), (h−1, v), (h, v), (h+1, v), (h+2, v); in the fourth line, (h−2, v+1), (h−1, v+1), (h, v+1), (h+1, v+1), (h+2, v+1); and in the fifth line, (h−2, v+2), (h−1, v+2), (h, v+2), (h+1, v+2), (h+2, v+2). More generally, the five-by-five matrix includes the pixels with coordinates (h+i, v+j), where i=−2, −1, 0, 1, or 2 and j=−2, −1, 0, 1, or 2. The value of the pixel with coordinates (h+i, v+j) will be denoted P(h+i, V+j).

Figure 3:
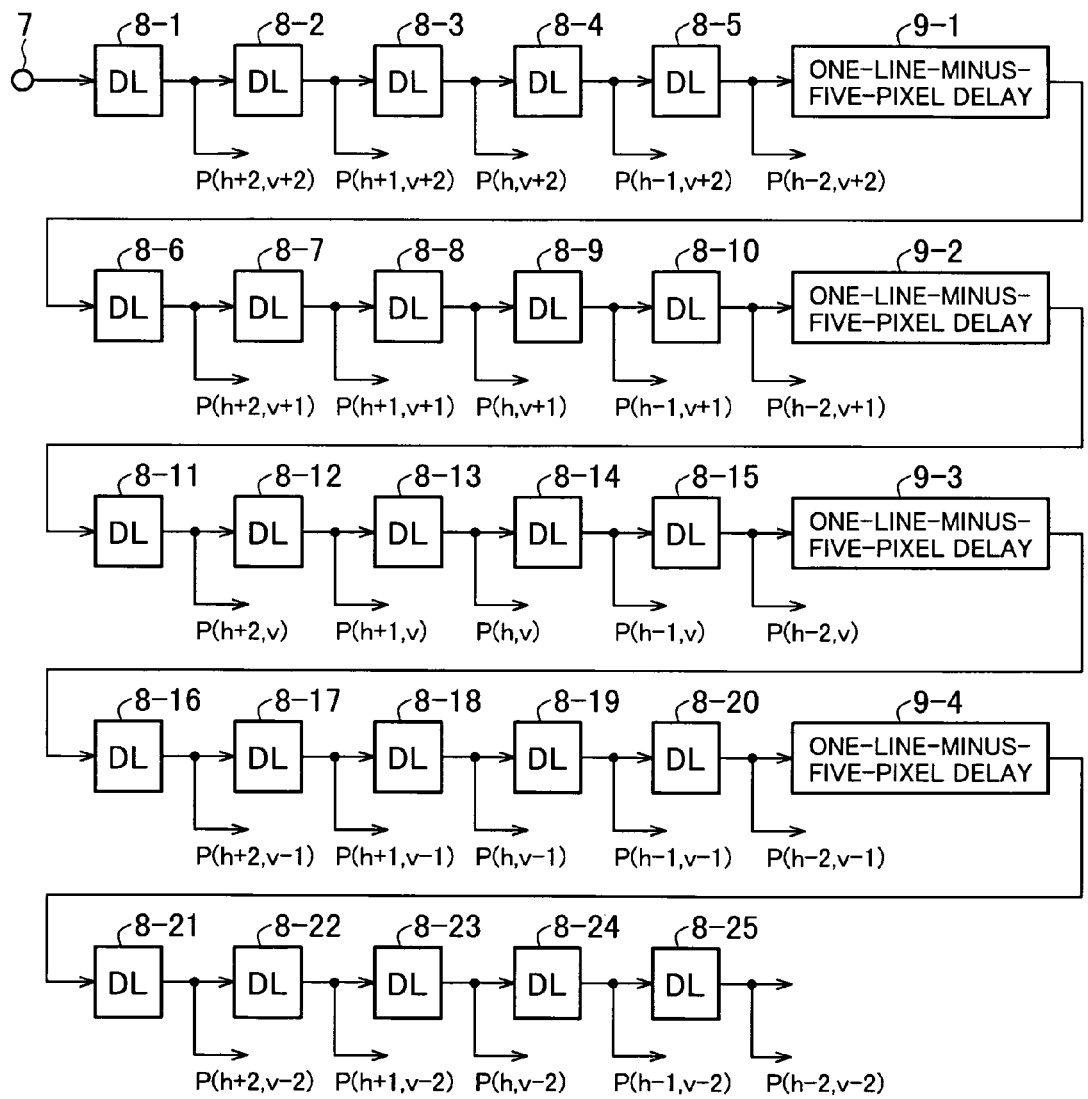
FIG. 3 is a block diagram showing an example of the blocking circuit in FIG. 1.
Figure 4:
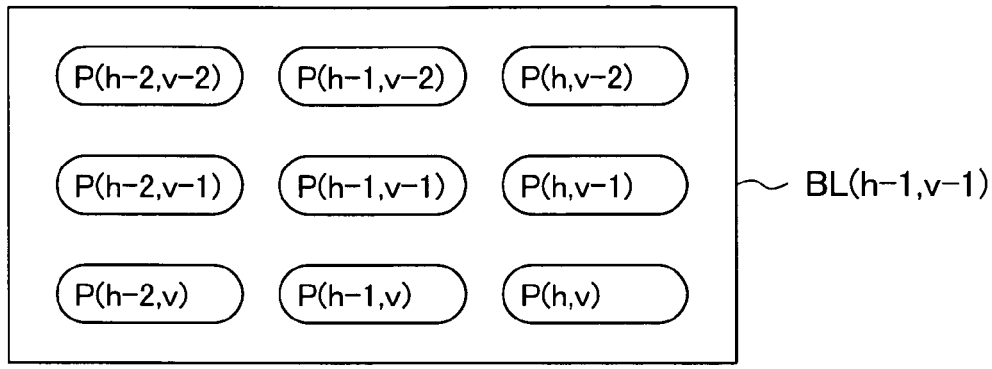
FIG. 4 is a diagram showing pixels constituting a neighboring block positioned to the upper left of a pixel of interest.
Figure 5:
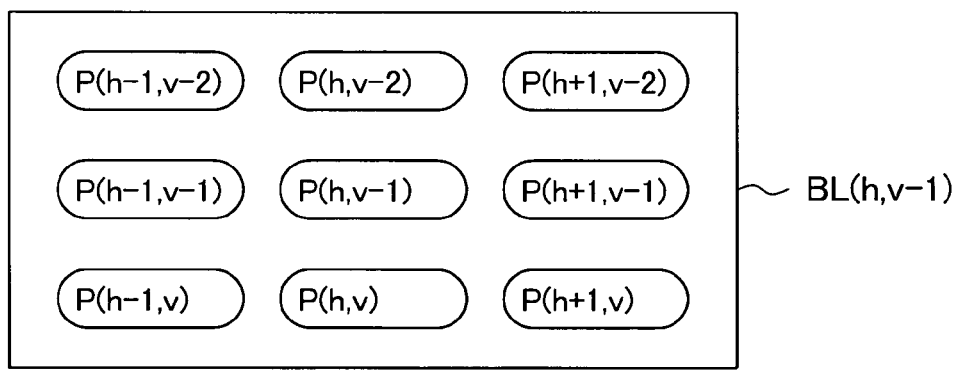
FIG. 5 is a diagram showing pixels constituting a neighboring block positioned above the pixel of interest.
Figure 6:
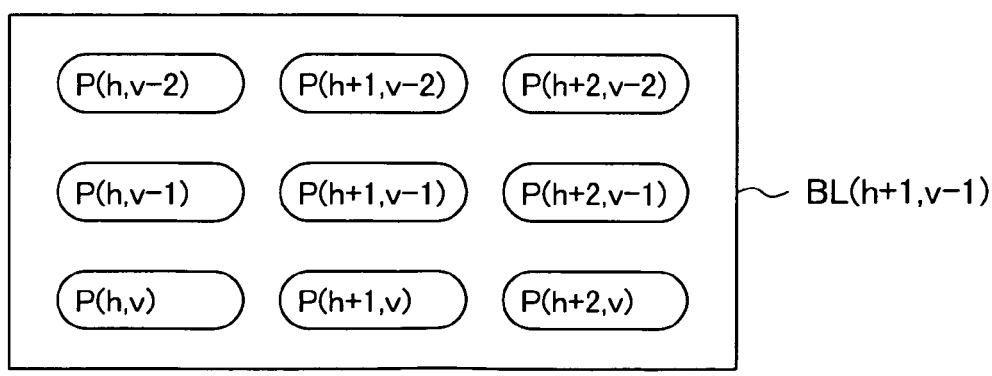
FIG. 6 is a diagram showing pixels constituting a neighboring block positioned to upper right of the pixel of interest.
Figure 7:
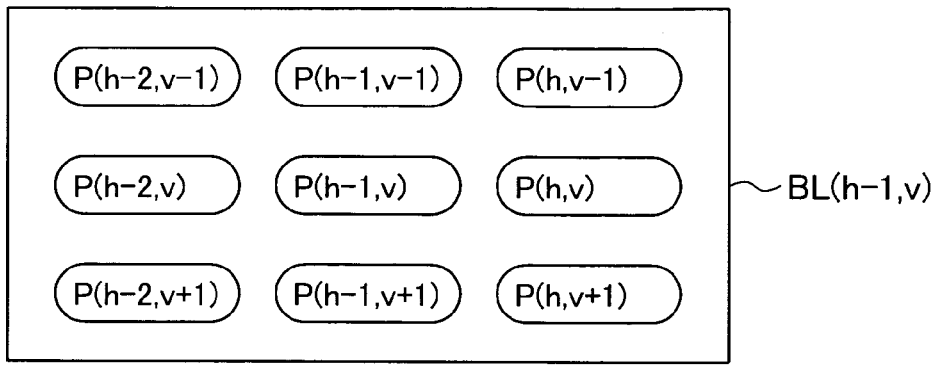
FIG. 7 is a diagram showing pixels constituting a neighboring block positioned to the left of the pixel of interest.

Referring to FIG. 3, the blocking circuit 2 comprises, for example, an input terminal 7 and a shift register including twenty-five one-pixel delay elements 8-1 to 8-25 and four one-line-minus-five-pixel delay elements 9-1 to 9-4. The one-pixel delay elements 8-1 to 8-25 output pixel values from P(h−2, v−2) to P(h+2, v+2).

In a variation of this structure, one-pixel delay element 8-1 is omitted; delay elements 9-1 and 8-6 are combined into a one-line-minus-four-pixel delay element; delay elements 9-2 and 8-11 are similarly combined; delay elements 9-3 and 8-16 are similarly combined; and delay elements 9-4 and 8-21 are similarly combined.

The five-by-five matrix in FIG. 2 includes a central three-by-three block BL(h, v) centered on pixel P(h, v). Also indicated in FIG. 2 are eight neighboring three-by-three blocks BL(h−1, v−1), BL(h, v−1), BL(h+1, v−1), BL(h−1, v), BL(h+1, v), BL(h−1, v+1), BL(h, v+1), and BL(h+1, v+1) centered on the eight pixels adjacent to pixel P(h, v) above and below, and to the left, right, upper right, lower right, upper left, and lower left. These eight neighboring blocks are accordingly centered at the pixels with coordinates (h−1, v−1), (h, v−1), (h+1, v−1), (h−1, v), (h+1, v), (h−1, v+1), (h, v+1), and (h+1, v+1). The pixels at the centers of these neighboring blocks also belong to the central block B(h, v).

The blocking circuit 2 supplies the pixel values of the twenty-five pixels in FIG. 2 in parallel to the sum of absolute differences calculation circuit 3. The sum of absolute differences calculation circuit 3 calculates a sum of absolute differences between the central block and each neighboring block.

Figure 8:
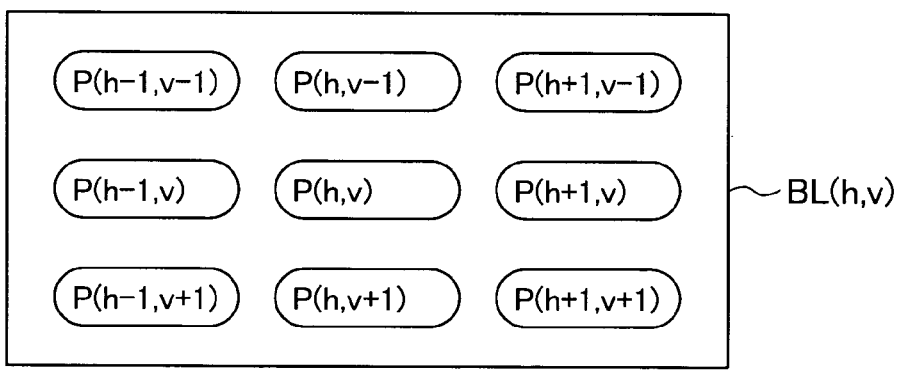
FIG. 8 is a block diagram showing pixels constituting the central block centered on the pixel of interest.
Figure 9:
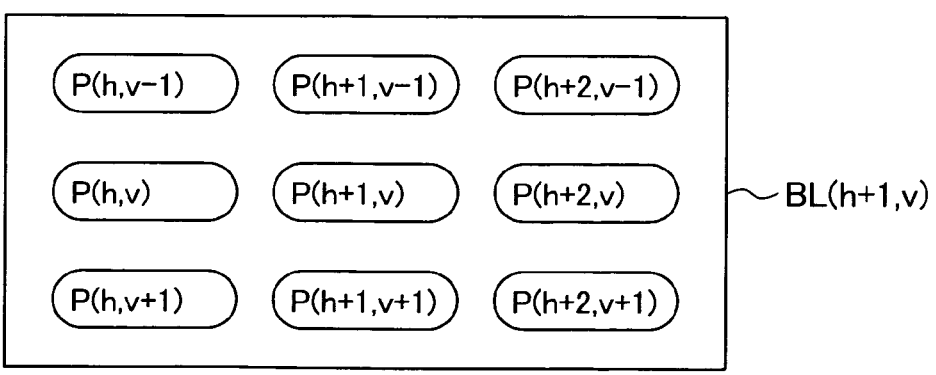
FIG. 9 is a diagram showing pixels constituting a neighboring block positioned to the right of the pixel of interest.
Figure 10:
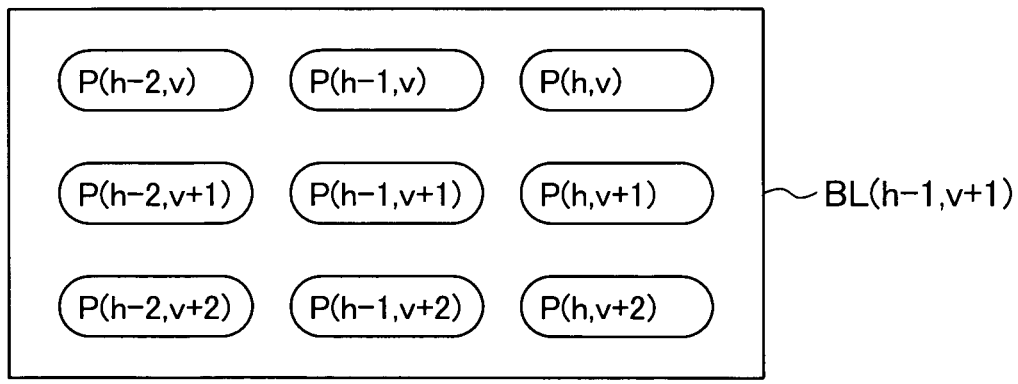
FIG. 10 is a diagram showing pixels constituting a neighboring block positioned to the lower left of the pixel of interest.
Figure 11:
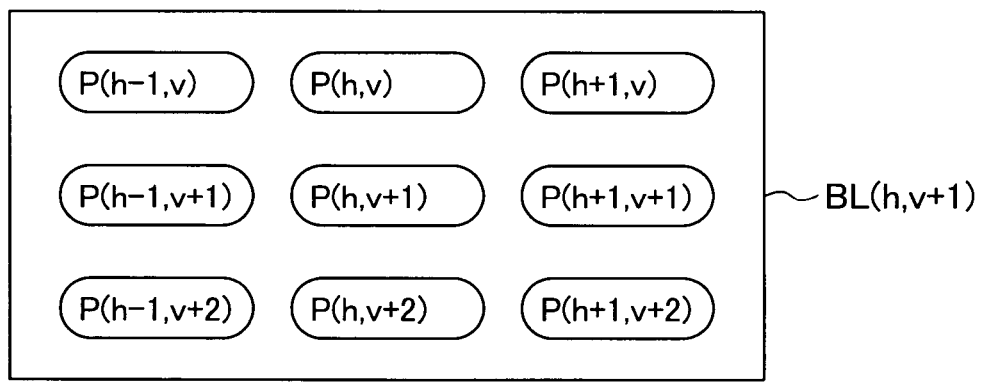
FIG. 11 is a diagram showing pixels constituting a neighboring block positioned below the pixel of interest.
Figure 12:
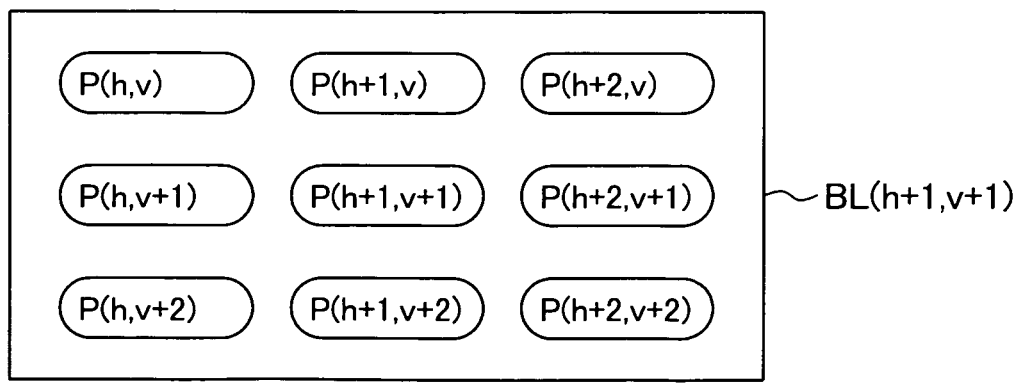
FIG. 12 is a diagram showing pixels constituting a neighboring block positioned to the lower right of the pixel of interest.

The central block and eight neighboring blocks are illustrated in FIGS. 4 to 12. A sum of absolute differences is a sum of the absolute values of the differences between the values of pixels in corresponding positions in the central and neighboring blocks. For example, when the sum of absolute differences between the central block and the upper left neighboring block is calculated, pixel P(h−2, v−2) in the upper left neighboring block BL(h−1, v−1), shown in FIG. 4, and pixel P(h−1, v−1) in the central block BL(h, v), shown in FIG. 8, are in corresponding positions. The sum of absolute differences SAD(h−1, v−1) between these two blocks has the following value:

$$SAD(h-1, v-1) = |P(h-2, v-2) - P(h-1, v-1)| +$$
$$|P(h-1, v-2) - P(h, v-1)| + |P(h, v-2) - P(h+1, v-1)| +$$
$$|P(h-2, v-1) - P(h-1, v)| + |P(h-1, v-1) - P(h, v)| +$$
$$|P(h, v-1) - P(h+1, v)| + |P(h-2, v) - P(h-1, v+1)| +$$
$$|P(h-1, v) - P(h, v+1)| + |P(h, v) - P(h+1, v+1)|$$

This sum of absolute differences can also be written as follows:

$$SAD(h-1, v-1) = \sum_{x=v-1}^{v+1} \sum_{y=h-1}^{h+1} |P(x-1, y-1) - P(x, y)|$$

The sums of absolute differences calculated for the other seven neighboring blocks can be expressed in a similar form. For the neighboring block BL(h+i, v+j) centered on pixel P(h+i, v+j), where i=−1, 0, or 1 and j=−1, 0, or 1, the sum of absolute differences is:

$$SAD(h+i, v+j) = \sum_{x=v-1}^{v+1} \sum_{y=h-1}^{h+1} |P(x+i, y+i) - P(x, y)|$$

Figure 13:
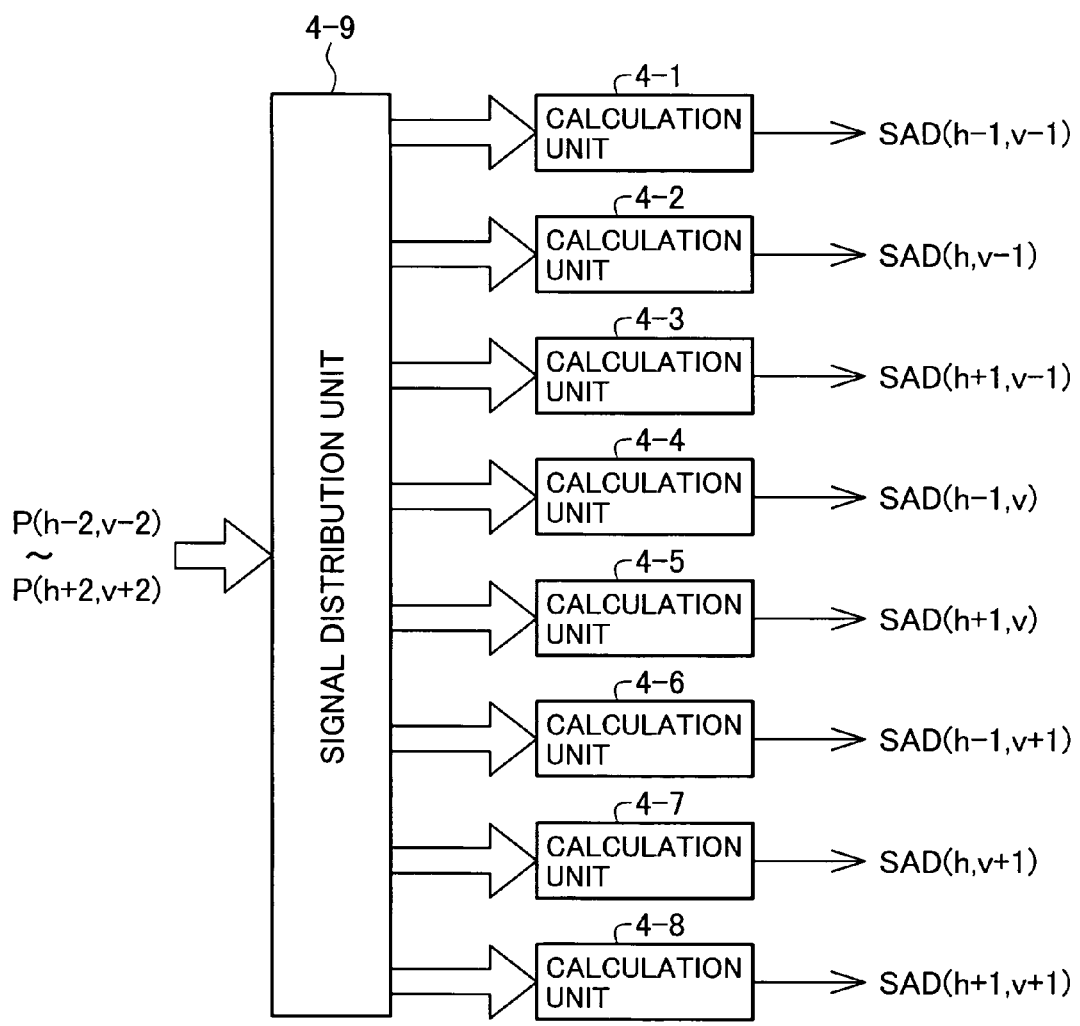
FIG. 13 is a block diagram showing an example of the sum of absolute differences calculation circuit in FIG. 1.

The correlation direction decision circuit 4 that performs these calculations has, for example, the structure shown in FIG. 13, comprising eight calculation units 4-1 to 4-8 that calculate the eight sums of absolute differences SAD(h−1, v−1) to SAD(h+1, v+1), and a signal distribution unit 4-9 that supplies each calculation unit with the necessary pixel values.

Figure 14:
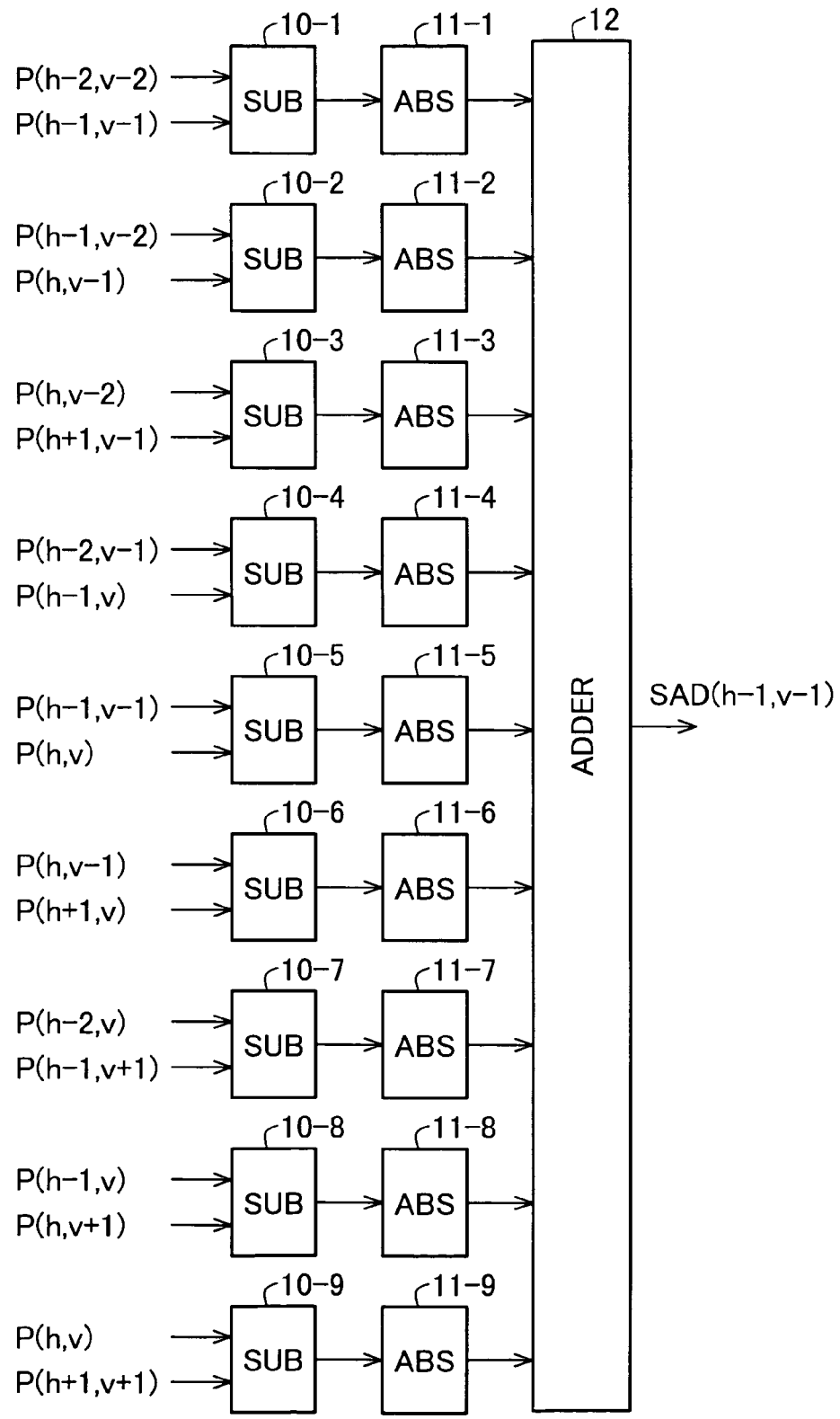
FIG. 14 is a block diagram illustrating one calculation unit in the sum of absolute differences calculation circuit in FIG. 13.
Figure 15:
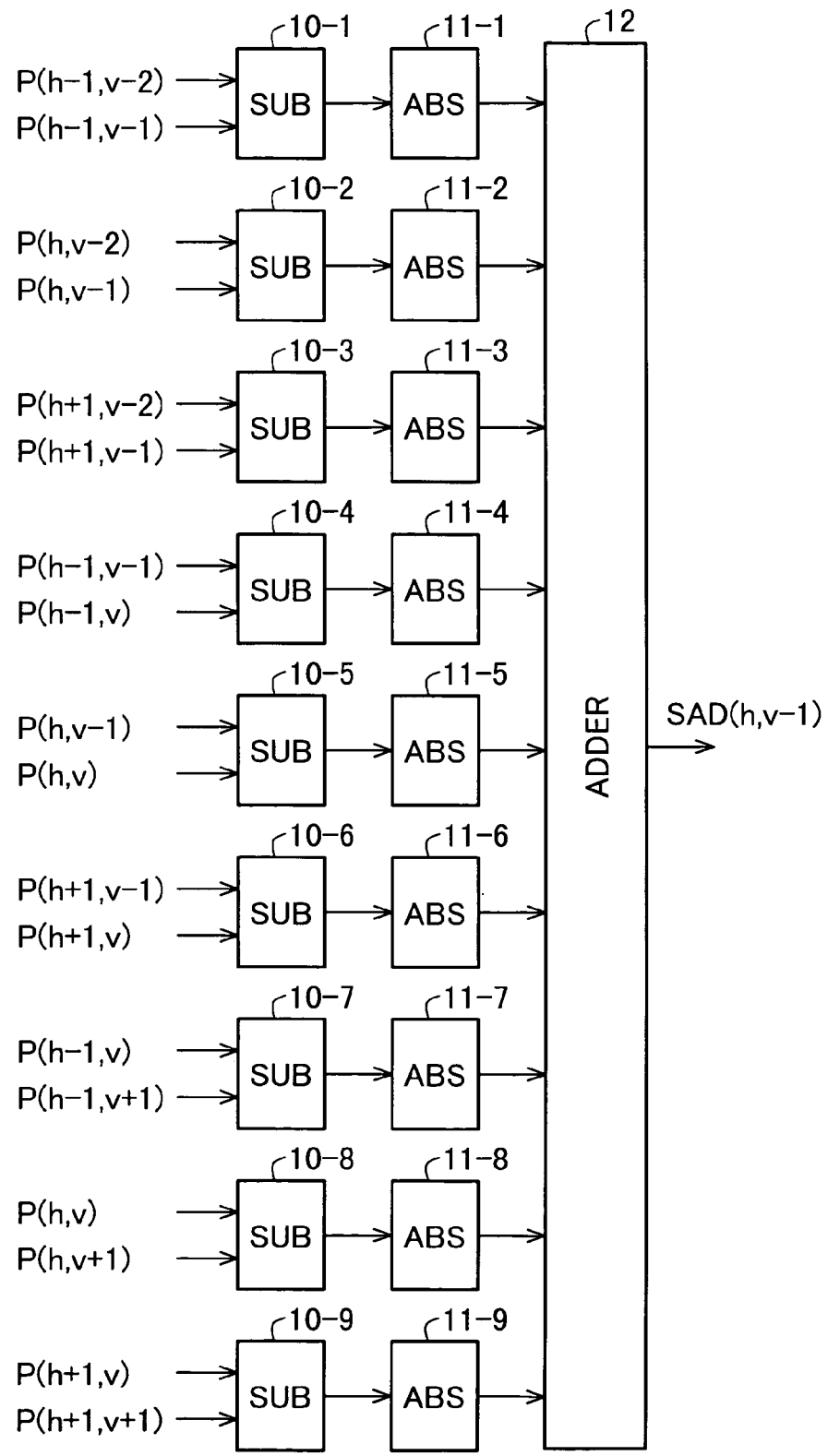
FIG. 15 is a block diagram illustrating another calculation unit of the sum of absolute differences calculation circuit in FIG. 13.

FIG. 14 shows the internal structure of the calculation unit 4-1 that calculates the sum of absolute differences SAD(h−1, v−1) between the central block BL(h, v) and the upper left neighboring block BL(h−1, v−1). FIG. 15 shows the internal structure of the calculation unit 4-2 that calculates the sum of absolute differences SAD(h, v−1) between the central block BL(h, v) and the upper neighboring block BL(h, v−1). The other six calculation units 4-3, 4-4, 4-5, 4-6, 4-7, 4-8 have similar structures, drawings of which are omitted.

In calculation unit 4-1 in FIG. 14, subtractor (SUB) 10-1 takes the difference between the upper left pixel values P(h−2, v−2) and P(h−1, v−1), subtractor 10-2 takes the difference between the upper pixel values P(h−1, v−2) and P(h, v−1), subtractor 10-3 takes the difference between the upper right pixel values P(h, v−2) and P(h+1, v−1), subtractor 10-4 takes the difference between the left pixel values P(h−2, v−1) and P(h−1, v), subtractor 10-5 takes the difference between the central pixel values P(h−1, v−1) and P(h, v), subtractor 10-6 takes the difference between the right pixel values P(h, v−1) and P(h+1, v), subtractor 10-7 takes the difference between the lower left pixel values P(h−2, v) and P(h−1, v+1), subtractor 10-8 takes the difference between the lower pixel values P(h−1, v) and P(h, v+1), and subtractor 10-9 takes the difference between the lower right pixel values P(h, v) and P(h+1, v+1). Absolute value calculators (ABS) 11-1 to 11-9 take the absolute values of these differences. An adder 12 adds the nine absolute values to obtain the sum of absolute differences SAD(h−1, v−1).

The calculation unit 4-2 in FIG. 15 and the other six calculation units 4-3 to 4-8 have the same structure, but receive different inputs from the signal distributor 4-9 in FIG. 13. The outputs of all eight calculation units 4-1 to 4-8 are supplied to the correlation direction decision circuit 4.

In the correlation direction decision circuit 4, the sums of absolute differences are treated as representing the strength of the correlation between the pixel of interest P(h, v) and eight directions indicated by lines extending from the pixel of interest through the centers of the neighboring blocks. For example, SAD(h−1, v−1) represents the correlation with the upper left direction. A smaller sum of differences indicates a stronger correlation. The correlation direction decision circuit 4 selects the direction indicated by the smallest of the eight sums of differences as the direction of correlation of the pixel of interest, and outputs a signal DC indicating this direction to the variable-direction one-dimensional filter circuit 5.

The variable-direction one-dimensional filter circuit 5 receives the twenty-five pixel values output in parallel by the blocking circuit 2 and the direction of correlation signal DC output by the correlation direction decision circuit 4, takes a weighted average Pa of the value of the pixel of interest and the values of the two pixels closest to the pixel of interest in its direction of correlation, and outputs the result to the output terminal 6. Taking this weighted average is a type of one-dimensional filtering process.

Figure 16:
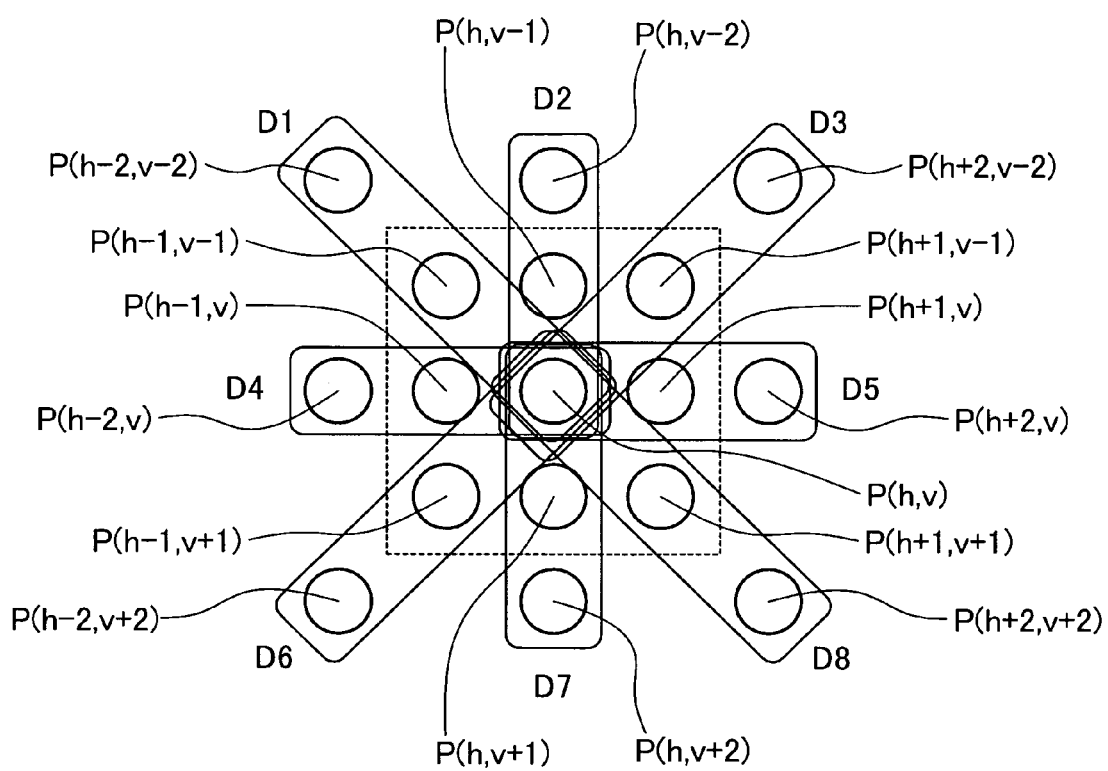
FIG. 16 is a diagram illustrating sets of three pixels for which the variable-direction one-dimensional filter circuit in FIG. 1 calculates weighted average values.

FIG. 16 illustrates the eight possible directions of correlation and the two pixels neighboring the pixel of interest P(h, v) in each direction. All of these pixels are part of the five-by-five matrix received from the blocking circuit 2. The weighted average is a weighted average of one of the sets of three pixels D1 to D8.

Figure 17:
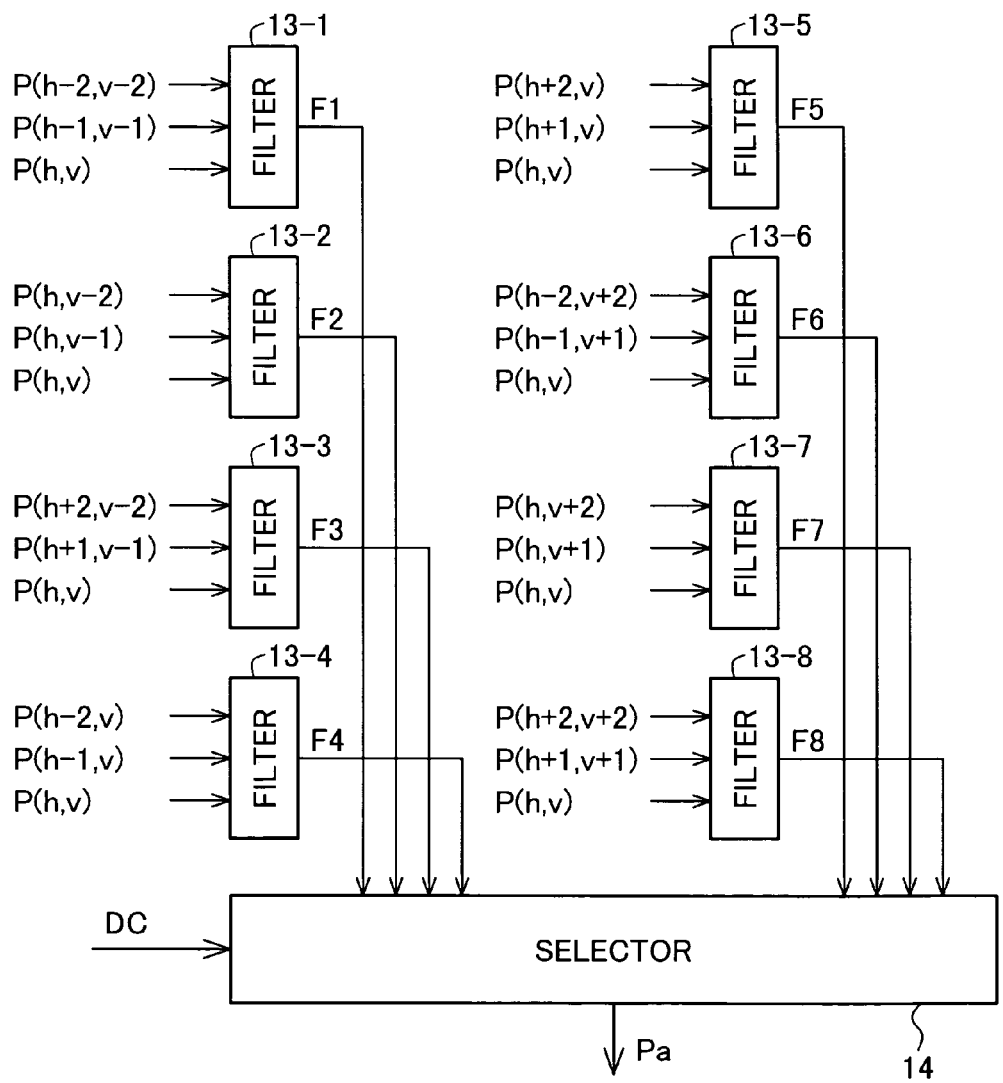
FIG. 17 is a block diagram showing an example of the variable-direction one-dimensional filter circuit in FIG. 1.

The variable-direction one-dimensional filter circuit 5 has, for example, the structure shown in FIG. 17, comprising eight one-dimensional filters 13-1 to 13-8 and a selector 14.

The eight sets of three pixel values are input to respective filters 13-1 to 13-8. Filter 13-1 receives the pixel values P(h−2, v−2), P(h−1, v−1), and P(h, v) in set D1. Filter 13-2 receives the pixel values P(h, v−2), P(h, v−1), and P(h, v) in set D2. Filter 13-3 receives the pixel values P(h+2, v−2), P(h+1, v−1), and P(h, v) in set D3. Filter 13-4 receives the pixel values P(h−2, v), P(h−1, v), and P(h, v) in set D4. Filter 13-5 receives the pixel values P(h+2, v), P(h+1, v), and P(h, v) in set D5. Filter 13-6 receives the pixel values P(h−2, v+2), P(h−1, v+1), and P(h, v) in set D6. Filter 13-7 receives the pixel values P(h, v+2), P(h, v+1), and P(h, v) in set D7. Filter 13-8 receives the pixel values P(h+2, v+2), P(h+1, v+1), and P(h, v) in set D8.

Each one-dimensional filter multiplies the three pixel values it receives by predetermined weights and takes the sum of the three products. The pixel of interest has the greatest weight. For example, the pixel of interest may have a weight of $2/4$ and the other two pixels in the set may have weights of $1/4$ each.

The selector 14 selects the weighted average calculated by one of the one-dimensional filters 13-1 to 13-8 according to the direction of correlation signal DC and outputs the selected weighted average Pa. If the direction of correlation is the upper left direction, corresponding to the pixels in set D1, the output of filter 13-1 is selected. If the direction of correlation is the upper direction, corresponding to the pixels in set D2, the output of filter 13-2 is selected. If the direction of correlation is the upper right direction, corresponding to the pixels in set D3, the output of filter 13-3 is selected. If the direction of correlation is the left direction, corresponding to the pixels in set D4, the output of filter 13-4 is selected. If the direction of correlation is the right direction, corresponding to the pixels in set D5, the output of filter 13-5 is selected. If the direction of correlation is the lower left direction, corresponding to the pixels in set D6, the output of filter 13-6 is selected. If the direction of correlation is the lower direction, corresponding to the pixels in set D7, the output of filter 13-7 is selected. If the direction of correlation is the lower right direction, corresponding to the pixels in set D8, the output of filter 13-8 is selected.

Figure 18:
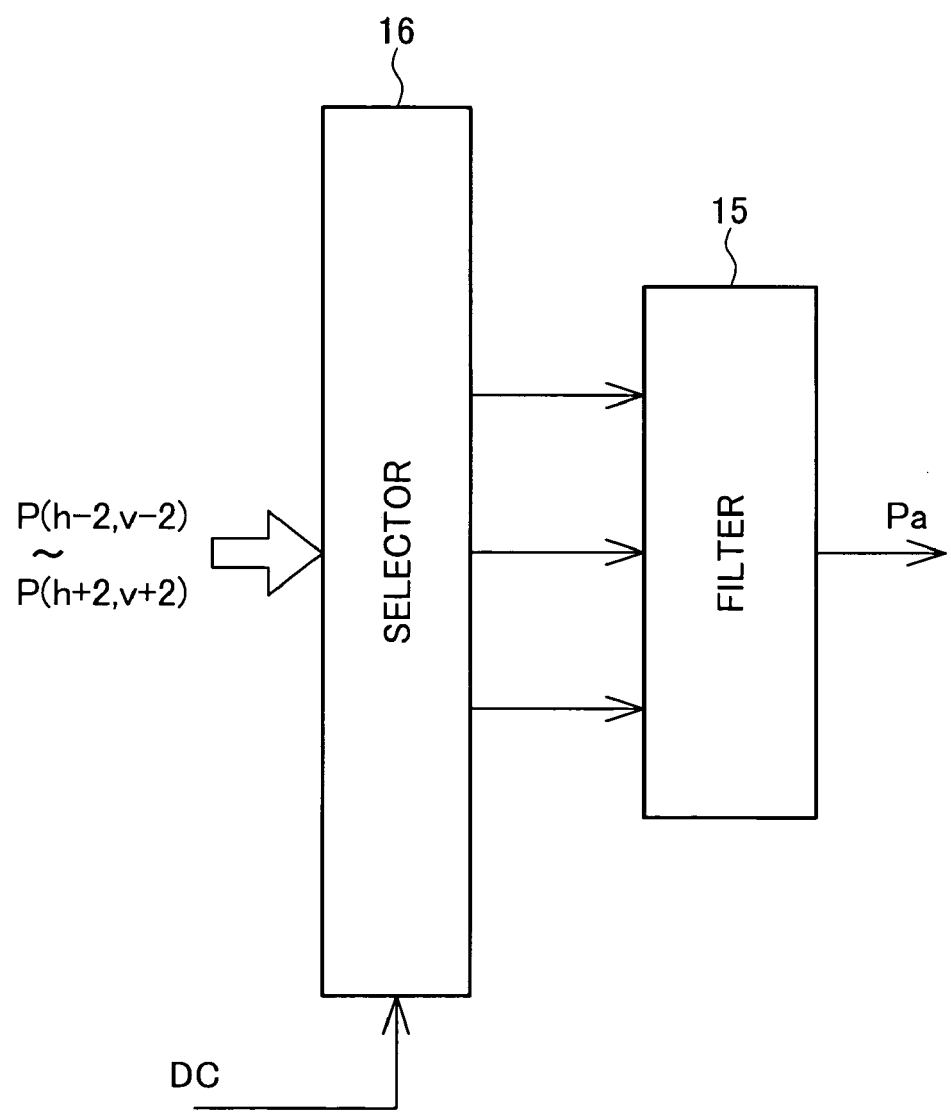
FIG. 18 is a block diagram showing another example of the variable-direction one-dimensional filter circuit in FIG. 1.

FIG. 18 shows an alternate configuration of the variable-direction one-dimensional filter circuit 5, comprising a single one-dimensional filter 15 and a selector 16. The selector 16 receives the twenty-five pixel values P(h−2, v−2) to P(h+2, v+2) output from the blocking circuit 2 selects one set of three of them according to the direction of correlation signal DC, and supplies the three values to the filter 15, which performs a one-dimensional filtering operation by taking a weighted average as described above and outputs the weighted average Pa. Accordingly, the selector 16 selects pixel values P(h−2, v−2), P(h−1, v−1), and P(h, v) if the direction of correlation is the upper left direction, pixel values P(h, v−2), P(h, v−1), and P(h, v) if the direction of correlation is the upper direction, pixel values P(h+2, v−2), P(h+1, v−1), and P(h, v) if the direction of correlation is the upper right direction, pixel values P(h−2, v), P(h−1, v), and P(h, v) if the direction of correlation is the left direction, pixel values P(h+2, v), P(h+1, v), and P(h, v) if the direction of correlation is the right direction, pixel values P(h−2, v+2), P(h−1, v+1), and P(h, v) if the direction of correlation is the lower left direction, pixel values P(h, v+2), P(h, v+1), and P(h, v) if the direction of correlation is the lower direction, and pixel values P(h+2, v+2), P(h+1, v+1), and P(h, v) if the direction of correlation is the lower right direction.

By using the sum of differences calculation to compare entire blocks of pixels, the first embodiment is able to determine the best direction of correlation with higher reliability than would be possible just by comparing the pixel of interest with other pixels in different directions, as in the Japanese Patent Application Publication cited above. The direction of correlation can be determined quickly because the sum of difference calculations can be carried out in parallel. Complex algorithms for distinguishing between stationary and moving parts of a picture and finding motion vectors for the moving parts are not needed. No frame buffer is required; the circuit in FIG. 3, essentially four line buffers plus five pixel buffers, provides adequate memory. Compared with noise coring, there is less loss of fine detail; even faint, low-amplitude detail can be preserved.

Second Embodiment

Figure 19:
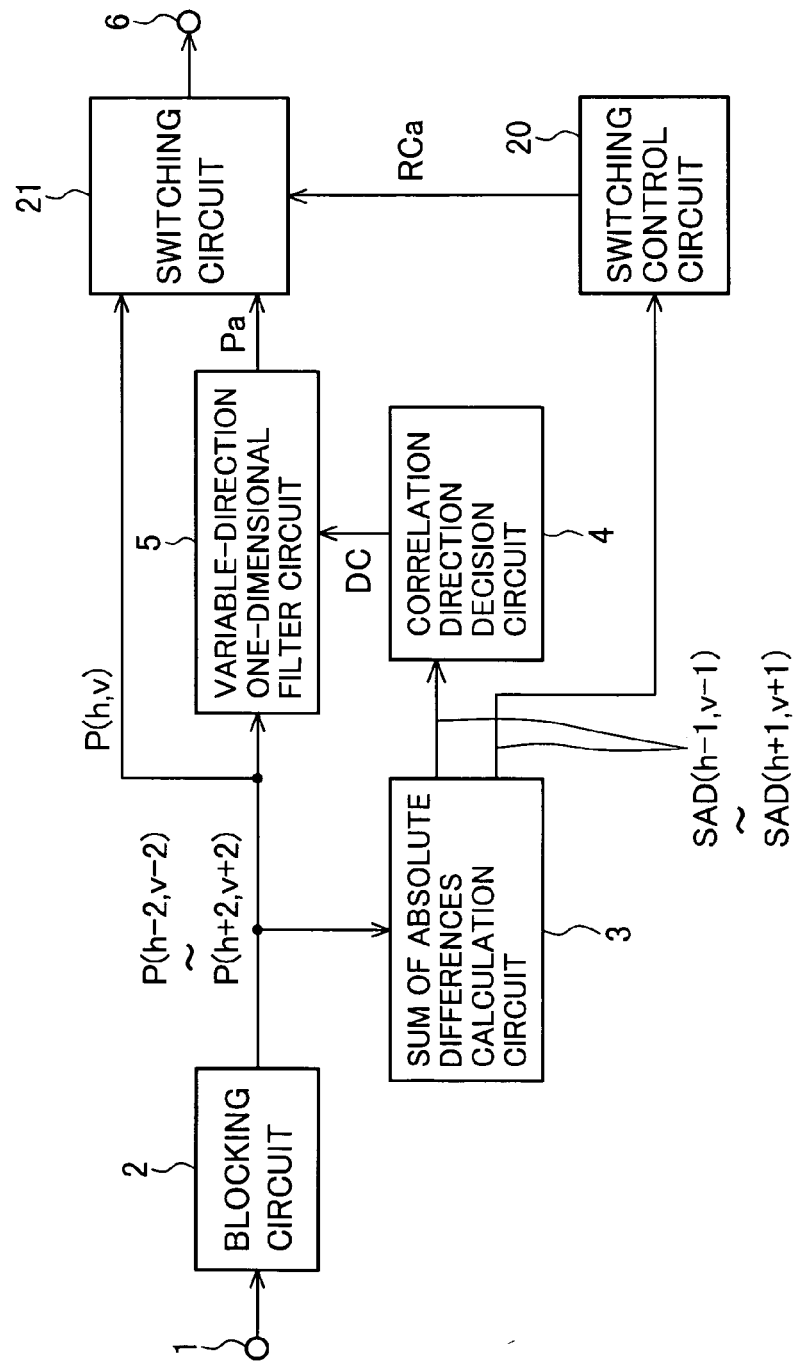
FIG. 19 is a block diagram showing a noise reducer according to a second embodiment of the invention.

Referring to FIG. 19, the second embodiment adds a switching control circuit 20 and a switching circuit 21 to the configuration in the first embodiment. The blocking circuit 2, sum of absolute differences calculation circuit 3, correlation direction decision circuit 4, and variable-direction one-dimensional filter circuit 5 operate as described in the first embodiment.

Figure 20:
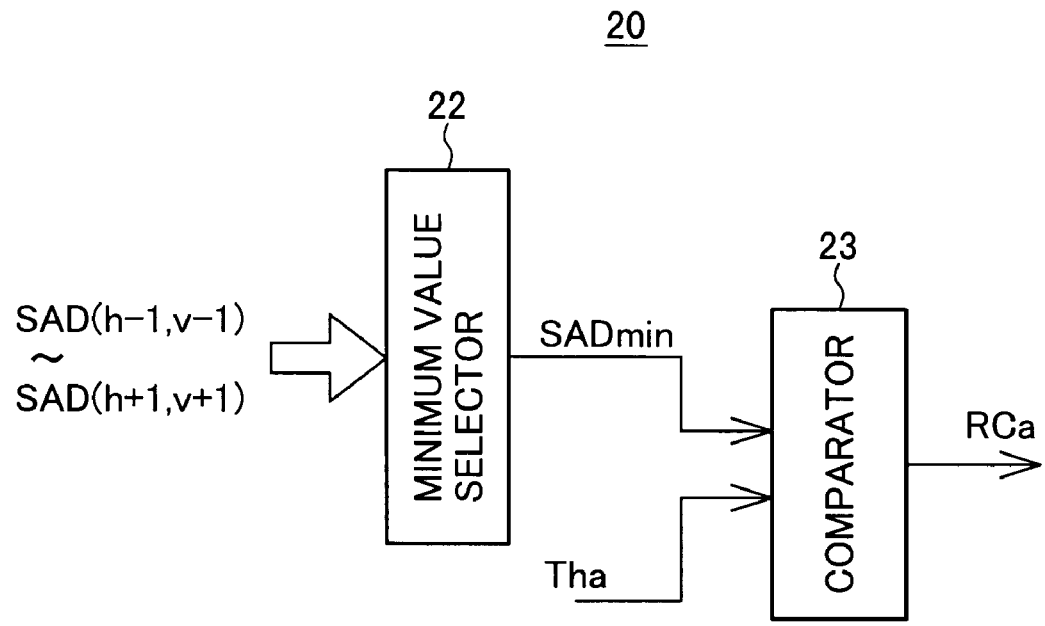
FIG. 20 is a block diagram showing an example of the switching control circuit in FIG. 19.

The switching control circuit 20 receives the sums of absolute differences SAD(h−1, v−1) to SAD(h+1, v+1) from the sum of absolute differences calculation circuit 3, decides whether the minimum sum of differences SADmin exceeds a predetermined threshold Tha, and outputs a result signal RCa indicating the result of this decision to the switching circuit 21. The switching control circuit 20 has, for example, the structure shown in FIG. 20, comprising a minimum value selector 22 that receives the sums of absolute differences SAD(h−1, v−1) to SAD(h+1, v+1) and selects the minimum sum of differences SADmin, and a comparator 23 that compares the minimum sum of differences SADmin with the threshold Tha and outputs the result signal RCa.

The switching circuit 21 receives the value of the pixel of interest P(h, v) from the blocking circuit 2 and the weighted average Pa output by the variable-direction one-dimensional filter circuit 5, selects one of these two inputs, and outputs the selected value to the output terminal 6. When the result signal RCa from the switching control circuit 20 indicates that the minimum sum of differences SADmin is equal to or less than the threshold Tha, the switching circuit 21 selects and outputs the weighted average Pa. When the result signal RCa indicates that the minimum sum of differences SADmin exceeds the threshold Tha, so that the pixel of interest does not have any identifiable direction of strong correlation, the switching circuit 21 selects and outputs the unmodified pixel value P(h, v).

The threshold Tha should be set to a value such that a larger sum of differences is more likely to be due to chance than to any true correlation.

When the minimum sum of differences SADmin is equal to or less than the threshold Tha, the second embodiment operates in the same way as the first embodiment. When the minimum sum of differences SADmin exceeds the threshold Tha, by leaving the pixel of interest unchanged, the second embodiment avoids image degradation that might be caused by averaging the pixel of interest with pixels to which it is not related. This situation may occur when, for example, the pixel of interest is near two or more edges located in different directions.

Third Embodiment

Figure 21:
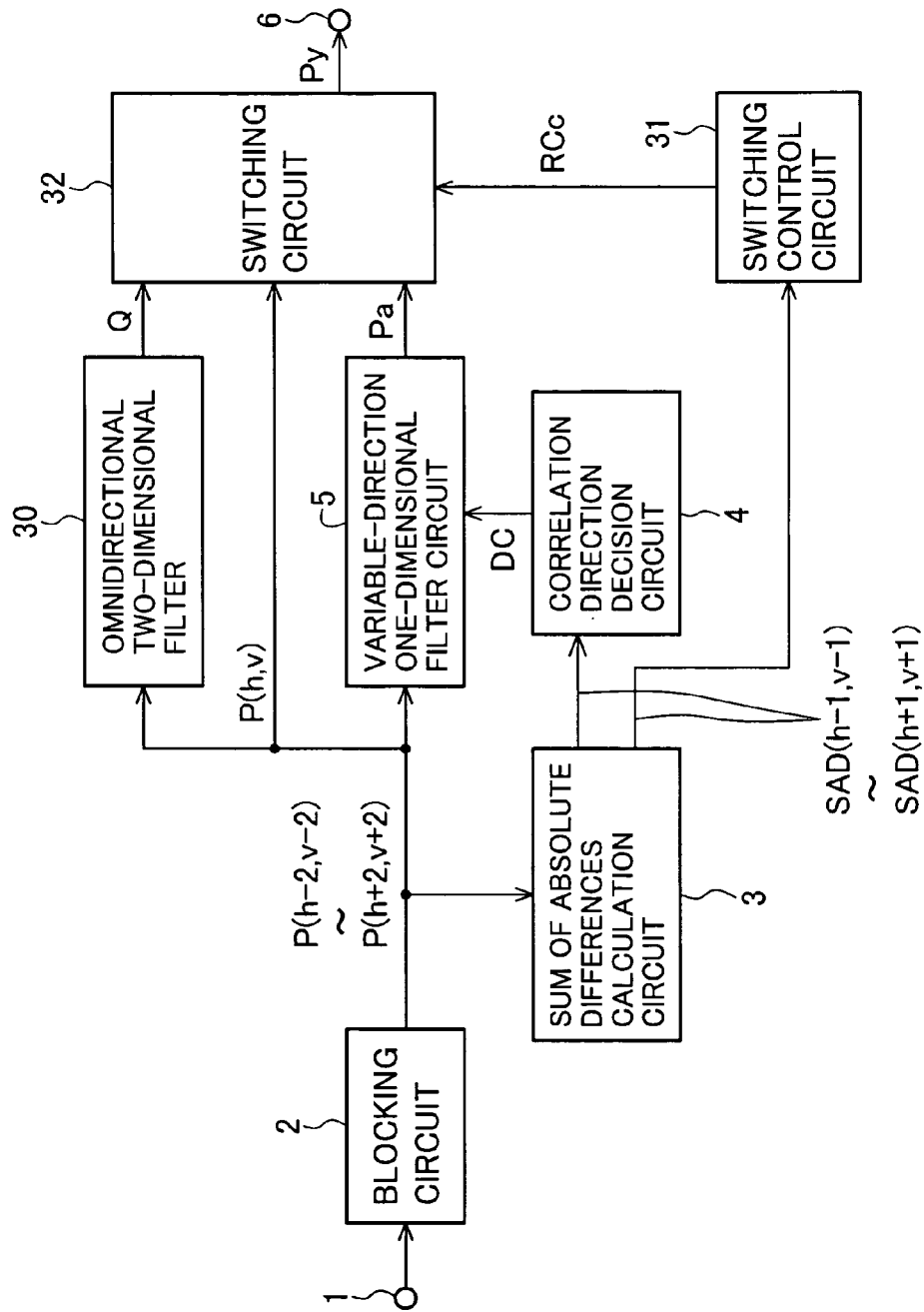
FIG. 21 is a block diagram showing a noise reducer according to a third embodiment of the invention.

Referring to FIG. 21, the third embodiment adds an omnidirectional two-dimensional filter 30, a switching control circuit 31, and a switching circuit 32 to the configuration in the first embodiment. The blocking circuit 2, sum of absolute differences calculation circuit 3, correlation direction decision circuit 4, and variable-direction one-dimensional filter circuit 5 operate as described in the first embodiment.

The omnidirectional two-dimensional filter 30 receives the twenty-five pixel values P(h−2, v−2) to P(h+2, v+2) output from the blocking circuit 2, performs an omnidirectional two-dimensional filtering operation by multiplying each pixel value by a predetermined weight and adding the resulting products, and outputs the resulting sum Q. Examples of the filtering operation will be given below.

Figure 22:
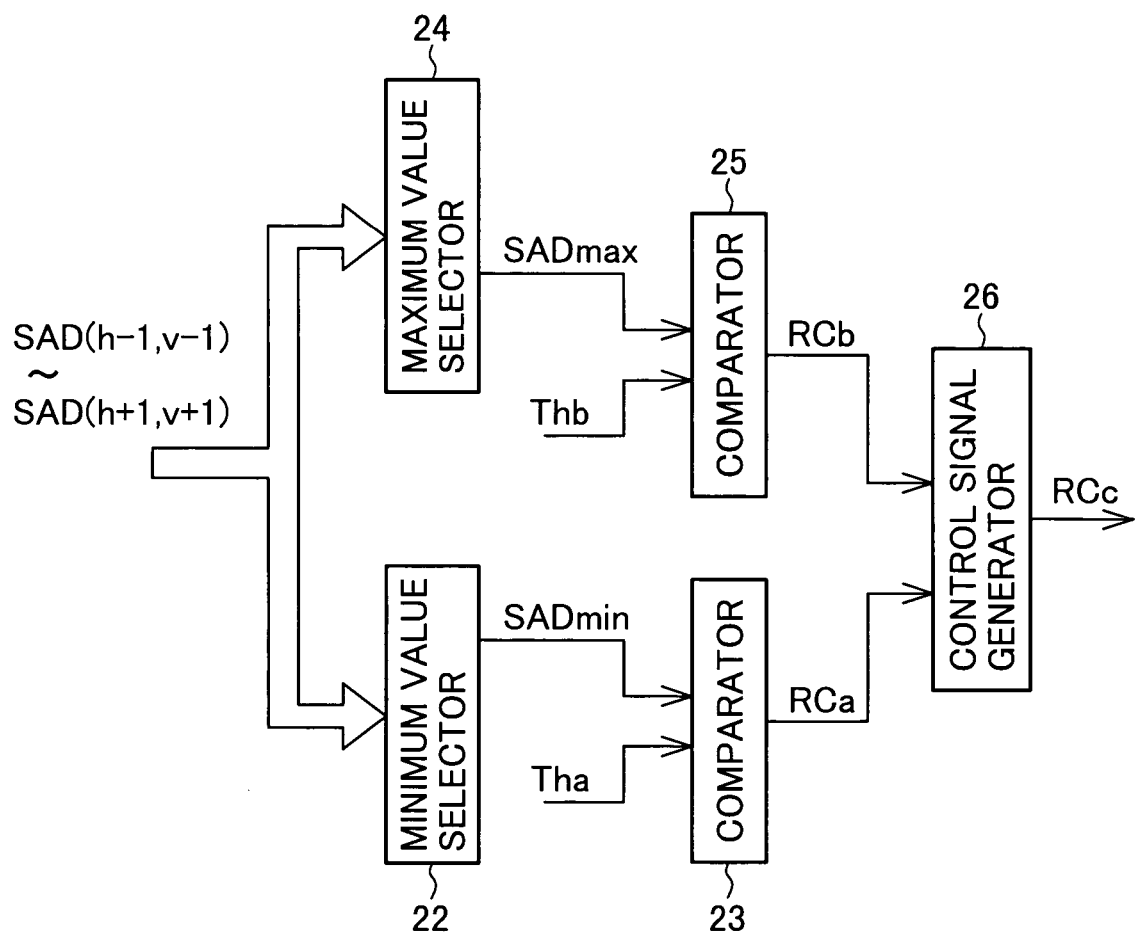
FIG. 22 is a block diagram showing an example of the switching control circuit in FIG. 21.

The switching control circuit 31 receives the sums of absolute differences SAD(h−1, v−1) to SAD(h+1, v+1) from the sum of absolute differences calculation circuit 3, compares the minimum sum of differences SADmin with a first threshold Tha, compares the maximum sum of differences SADmax with a second threshold Thb, which is less than the first threshold Tha, and outputs a control signal RCc to the switching circuit 32, indicating the result of these comparisons. The switching control circuit 31 has, for example, the structure shown in FIG. 22, comprising a minimum value selector 22 and comparator 23 that operate as described in the second embodiment to generate a first result signal RCa, a maximum value selector 24 that selects the maximum sum of differences SADmax, a comparator 25 that compares the maximum sum of differences SADmax with the second threshold Thb to generate a second result signal RCb, and a control signal generator 26 that generates the control signal RCc from the first and second result signals RCa, RCb.

The control signal RCc is given a first value when the maximum sum of differences SADmax is less than the second threshold Thb, a second value when the minimum sum of differences SADmin is greater than the first threshold Tha, and a third value when neither of these conditions is true, that is, when SADmin is equal to or less than the first threshold Tha and SADmax is equal to or greater than the second threshold Thb.

The switching circuit 32 receives the original value P(h, v) of the pixel of interest from the blocking circuit 2, the one-dimensionally filtered pixel value Pa from the variable-direction one-dimensional filter circuit 5, and the two-dimensionally filtered pixel value Q from the omnidirectional two-dimensional filter 30, selects one of these input values according to the control signal RCc received from the switching control circuit 31, and outputs the selected value Py to the output terminal 6. When the control signal RCc has the first value, indicating that SADmax is less than the second threshold Thb, the switching circuit 32 selects and outputs the two-dimensionally filtered value Q. When the control signal RCc has the second value, indicating that SADmin exceeds the first threshold Tha, the switching circuit 32 selects and outputs the original pixel value P(h, v), as in the second embodiment. When the control signal RCc has the third value, the switching circuit 32 selects and outputs the one-dimensionally filtered value Pa.

In the two-dimensional filtering operation performed by the omnidirectional two-dimensional filter 30, the pixel of interest has the greatest weight. The other pixels in the five-by-five matrix may have identical smaller weights, or they may have weights that decrease with increasing distance from the pixel of interest.

In one exemplary weighting scheme, the weight of the pixel of interest is $8/32$ and the other pixels have weights of $1/32$. The filtered value Q(h, v) is calculated as follows:

$$Q(h, v) = \{8 \times P(h, v) + P(h-2, v-2) + P(h-1, v-2) + P(h, v-2) +$$
$$P(h+1, v-2) + P(h+2, v-2) + P(h-2, v-1) +$$

-continued $$P(h-1, v-1) + P(h, v-1) + P(h+1, v-1) + P(h+2, v-1) +$$
$$P(h-2, v) + P(h-1, v) + P(h+1, v) + P(h+2, v) +$$
$$P(h-2, v+1) + P(h-1, v+1) + P(h, v+1) + P(h+1, v+1) +$$
$$P(h+2, v+1) + P(h-2, v+2) + P(h-1, v+2) +$$
$$P(h, v+2) + P(h+1, v+2) + P(h+2, v+2)\}/32$$

In another exemplary weighting scheme, the pixel of interest has a weight of $32/64$, the eight pixels adjacent to the pixel of interest have weights of $2/64$, and the other pixels have weights of $1/64$. The filtered value Q(h, v) is calculated as follows:

$$Q(h, v) = [32 \times P(h, v) +$$
$$2 \times \{P(h-1, v-1) + P(h, v-1) + P(h+1, v-1) + P(h-1, v) +$$
$$P(h+1, v) + P(h-1, v+1) + P(h, v+1) + P(h+1, v+1)\} +$$
$$P(h-2, v-2) + P(h-1, v-2) + P(h, v-2) + P(h+1, v-2) +$$
$$P(h+2, v-2) + P(h-2, v-1) + P(h+2, v-1) + P(h-2, v) +$$
$$P(h+2, v) + P(h-2, v+1) + P(h+2, v+1) + P(h-2, v+2) +$$
$$P(h-1, v+2) + P(h, v+2) + P(h+1, v+2) + P(h+2, v+2)]/64$$

In yet another exemplary weighting scheme, the pixel of interest has a weight of $96/128$, the eight pixels adjacent to the pixel of interest have weights of $2/128$, and the other pixels have weights of $1/128$. The filtered value Q(h, v) is calculated as follows:

$$Q(h, v) = [96 \times P(h, v) +$$
$$2 \times \{P(h-1, v-1) + P(h, v-1) + P(h+1, v-1) + P(h-1, v) +$$
$$P(h+1, v) + P(h-1, v+1) + P(h, v+1) + P(h+1, v+1)\} +$$
$$P(h-2, v-2) + P(h-1, v-2) + P(h, v-2) + P(h+1, v-2) +$$
$$P(h+2, v-2) + P(h-2, v-1) + P(h+2, v-1) + P(h-2, v) +$$
$$P(h+2, v) + P(h-2, v+1) + P(h+2, v+1) + P(h-2, v+2) +$$
$$P(h-1, v+2) + P(h, v+2) + P(h+1, v+2) + P(h+2, v+2)]/128$$

The first of these three exemplary weighting schemes has the strongest filtering effect, and the last has the least filtering effect. The same weighting scheme may be used for all pictures, or the weighting scheme may be changed according to the picture content, by providing an additional circuit to detect picture features or characteristics and by switching filters according to the detected features or characteristics.

When the maximum sum of differences SADmax is less than the second threshold Thb, all eight sums of differences are small, so the pixel of interest is correlated with nearby pixels in all directions, and noise can be reduced more effectively by omnidirectional two-dimensional filtering than by one-dimensional filtering.

Without employing motion detection or other complex algorithms, the third embodiment is able to select two-dimensional filtering, one-dimensional filtering, or no filtering on a pixel-by-pixel basis to reduce noise effectively without the creation of needless artifacts or the needless loss of detail.

The present invention can be used to reduce picture noise not only in television sets, but in a wide range of video display devices, including liquid crystal displays and monitors.

A few variations of the preceding embodiments have been mentioned above, but those skilled in the art will recognize that further variations are possible within the scope of the invention, which is defined in the appended claims.

What is claimed is:

1. A noise reducer for reducing noise in a video signal, comprising:
   a sum of absolute differences calculation circuit that sequentially selects each pixel in an input video signal as a pixel of interest and calculates sums of absolute differences between a central block of a predetermined size centered on the pixel of interest and neighboring blocks of the predetermined size centered on pixels adjacent the pixel of interest above, below, and to the left, right, upper right, lower right, upper left, and lower left, each sum of absolute differences being calculated as a sum of absolute differences between values of pixels in corresponding positions in the central block and in one of the neighboring blocks;
   a correlation direction decision circuit that selects a correlation direction indicated by a line extending from the pixel of interest through a center of one of the neighboring blocks having a minimum sum of absolute differences; and
   a variable-direction one-dimensional filter circuit that calculates a first weighted average of the pixel of interest and at least one pixel located in the correlation direction from the pixel of interest, and generates a first output signal having the first weighted average as a value for the pixel of interest.

2. The noise reducer of claim 1, wherein the variable-direction one-dimensional filter circuit, in calculating the weighted average value, gives a greatest weight to the pixel of interest.

3. The noise reducer of claim 1, wherein the variable-direction one-dimensional filter circuit gives a weight of $2/4$ to the pixel of interest and gives a weight of $1/4$ to each of two pixels located in the correlation direction from the pixel of interest.

4. The noise reducer of claim 1, further comprising:
   a switching control circuit that compares the minimum sum of absolute differences with a predetermined threshold; and
   a switching circuit, controlled by the switching control circuit, that generates a second output signal by selecting the first output signal from the variable-direction one-dimensional filter circuit when the minimum sum of absolute differences is less than or equal to the predetermined threshold and selecting the value of the pixel of interest in the input video signal when the minimum sum of absolute differences is greater than the predetermined threshold.

5. The noise reducer of claim 1, further comprising:
   an omnidirectional two-dimensional filter that carries out a two-dimensional omnidirectional filtering operation centered on the pixel of interest to generate a second output signal;
   a switching control circuit that compares the minimum sum of absolute differences with a first predetermined threshold, selects a maximum sum of absolute differences among the sum of absolute differences, and compares the maximum sum of absolute differences with a second threshold, the second threshold being less than the first threshold; and
   a switching circuit, controlled by the switching control circuit, that generates a third output signal by selecting the second output signal from the omnidirectional two-dimensional filter when the maximum sum of differences is less than the second predetermined threshold, selecting the first output signal from the variable-direction one-dimensional filter circuit when the maximum sum of differences is greater than or equal to the second predetermined threshold and the minimum sum of absolute differences is less than or equal to the first predetermined threshold, and selecting the value of the pixel of interest in the input video signal when the minimum sum of absolute differences is greater than the first predetermined threshold.

6. The noise reducer of claim 5, wherein the omnidirectional two-dimensional filter calculates a second weighted average in which the pixel of interest has a maximum weight and other pixels have weights that remain constant or diminish with increasing distance from the pixel of interest.

7. The noise reducer of claim 6, wherein the central block and the neighboring blocks are three-by-three blocks of pixels.

8. The noise reducer of claim 7, wherein the omnidirectional two-dimensional filter calculates the second weighted average over a five-by-five block of pixels centered on the pixel of interest.

9. The noise reducer of claim 8, wherein the omnidirectional two-dimensional filter multiplies the value of the pixel of interest by $8/32$ and multiplies the values of the twenty-four other pixels in the five-by-five block by $1/32$.

10. The noise reducer of claim 8, wherein the omnidirectional two-dimensional filter multiplies the value of the pixel of interest by $32/64$, multiplies the values of eight pixels immediately adjacent the pixel of interest by $2/64$, and multiplies the values of sixteen pixels surrounding the eight pixels by $1/64$.

11. The noise reducer of claim 8, wherein the omnidirectional two-dimensional filter multiplies the value of the pixel of interest by $96/128$, multiplies the values of eight pixels immediately adjacent the pixel of interest by $2/128$, and multiplies the values of sixteen pixels surrounding the eight pixels by $1/128$.

12. The noise reducer of claim 1, wherein the input video signal is a television signal.

13. A method of reducing noise in video signals, comprising:
sequentially selecting each pixel in an input video signal as a pixel of interest and calculating sums of absolute differences between a central block of a predetermined size centered on the pixel of interest and neighboring blocks of the predetermined size centered on pixels adjacent the pixel of interest above and below and to the left, right, upper right, lower right, upper left, and lower left, each sum of absolute differences being calculated as a sum of absolute differences between values of pixels in corresponding positions in the central block and in one of the neighboring blocks;
selecting a correlation direction indicated by a line extending from the pixel of interest through a center of one of the neighboring blocks having a minimum sum of absolute differences;
calculating a weighted average of the pixel of interest and at least one pixel located in the correlation direction from the pixel of interest; and
generating an output signal having the weighted average as a value for the pixel of interest.

* * * * *